(12) United States Patent
Molne

(10) Patent No.: US 6,243,080 B1
(45) Date of Patent: Jun. 5, 2001

(54) TOUCH-SENSITIVE PANEL WITH SELECTOR

(75) Inventor: Anders L. Molne, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/115,361

(22) Filed: Jul. 14, 1998

(51) Int. Cl.$^7$ .............................. G09G 5/00; G09G 5/08
(52) U.S. Cl. .................. 345/173; 345/157; 345/169; 455/90; 455/566
(58) Field of Search .................... 345/169, 173, 345/157; 455/566, 90; 178/18

(56) References Cited

U.S. PATENT DOCUMENTS

| | | |
|---|---|---|
| 5,237,311 | 8/1993 | Mailey et al. . |
| 5,510,813 * | 4/1996 | Makinwa et al. ............... 345/173 |
| 5,638,061 | 6/1997 | Levin et al. . |
| 5,670,755 * | 9/1997 | Kwon ............................. 345/173 |
| 5,680,160 * | 10/1997 | LaPinte ............................ 345/173 |
| 5,742,894 * | 4/1998 | Jambhekar et al. ............. 455/90 |
| 6,034,672 * | 3/2000 | Gaultier et al. ................. 345/173 |

* cited by examiner

Primary Examiner—Bipin Shalwala
Assistant Examiner—David L. Lewis

(74) Attorney, Agent, or Firm—Coats & Bennett, PLLC

(57) ABSTRACT

A wireless communications device, such as a cellular telephone, is provided with a touch-sensitive panel that is moveable between a normal position and a select position. The display on the wireless communications device is preferably graphical and includes a cursor; the movement of the cursor is controlled, at least in part, by the user's interaction with the touch-sensitive panel. The touch-sensitive panel is movable by rotation or simple vertical displacement between a normal up position and a select or down position. When the user pushes down on the touch-sensitive panel, the touch-sensitive panel is rotated or otherwise displaced into the second position. A detector, such as a reed switch or dome spring switch, senses when the touch-sensitive panel is moved to the select position and, in response, changes from an unselected state to a selected state. This state change is communicated to the main electronics of the wireless communications device to signal that a selection is occurring. When the touch-sensitive panel returns to the first position, the detector returns to the unselected state. Optionally, the touch-sensitive panel rests on a support which provides a bias force to urge the touch-sensitive panel to return to the normal position from the select position. This arrangement allows the user to select, and optionally, "drag-and-drop," without removing their finger from the touch-sensitive panel, preferably with suitable tactile and audible feedback to the user.

17 Claims, 6 Drawing Sheets

TOUCH-SENSITIVE PANEL WITH SELECTOR

FIELD OF THE INVENTION

The present invention relates generally to wireless communications devices, and more particularly to wireless communications devices having touch-sensitive panels.

BACKGROUND OF THE INVENTION

Wireless communications devices, such as cellular telephones, have proven very popular. Over time, these devices have been reduced greatly in size and weight. At the same time, the complexity of functions offered by such devices is increasing, adding such functions as internet access and two way text messaging. Increased functionality has led to a demand for wireless communications devices with larger displays and more keys. However, as the overall size of such devices shrinks, there is less space for keys or other input means.

In addition, displays for wireless communications device have evolved from character based designs to full graphic displays. Accordingly, there is a growing need to a user to navigate through the text input or selection menus in two dimensions. That is, there is growing need for the user to be able to direct a cursor to various locations on the display without being limited to strictly up-down or side-to-side movement on the display. In addition to movement of the cursor ("cursor movement" function), the user must be able to select information once the pointer is moved ("select" function) and preferably maintain a selection for subsequent movement of the cursor ("drag and drop" function).

Manufacturers of wireless communications device employ a number of approaches to supply the desired functionality. For instance, some wireless communications device employ two directional keys (up/down or left/right) in combination with some sort of selection key such as an "enter," "yes," or "OK" key. Other units employ four arrow keys or a combined rocking-key in combination with a selection key. Some more advanced wireless communications devices employ pen-based inputs. Still other wireless communications devices employ touch-sensitive panels integrated as part of the display, sometimes referred to as touch-sensitive displays. When touch-sensitive displays are used, selection is either via a dedicated selection key or via a quick tap on the display. When a tap is used, it is the quick duration of a tap that differentiates the "select" function from the "cursor movement" function.

One problem with the use of touch-sensitive displays with tap selection is that the user must physically remove her finger from the touch-sensitive panel before initiating the tap. As a result, there is increased chance for key mis-hits and accidental alteration of the cursor's location. Another problem arising from the use of touch-sensitive displays with tap selection is the typical lack of suitable user feedback. Users prefer to have tactile, and preferably audible, feedback of the selection. For instance, when a key is pressed, users prefer to have a tactile feedback such as a click sensation. Users typically further prefer to have audible feedback such as a click sound or a beep. Current touch-sensitive displays do not typically provide such feedback.

In light of the above, there remains a need for wireless communications devices incorporating touch-sensitive panels having an associated selector that can be activated without removing the user's finger. Such touch-sensitive panels may be a separate portion of the wireless communications device or may be integrated with the wireless communications device's display. Further, it is preferred, but not required, that such a touch-sensitive panels give a user suitable tactile, and preferably audible, feedback.

SUMMARY OF THE INVENTION

The present invention provides a wireless communications device, such as a cellular telephone, with a touch-sensitive panel that is moveable between a normal position and a select position, thereby allowing for selection without removing the users finger from the touch-sensitive panel. The display on the wireless communications device is preferably graphical and includes a cursor; the movement of the cursor is controlled, at least in part, by the user's interaction with the touch-sensitive panel. The touch-sensitive panel is movable by rotation or simple vertical displacement between a first position and a second position. For instance, the first position can be the normal up position and the second position can be the select or down position. When the user pushes down on the touch-sensitive panel, preferably with a force at or above a predetermined level, the touch-sensitive panel is rotated or otherwise displaced into the second position. A detector, such as a reed switch or dome spring switch, senses when the touch-sensitive panel is moved to the select position and, in response, changes from an unselected state to a selected state. This state change is communicated to the main electronics of the wireless communications device, such as a microprocessor, to signal the wireless communications device that a selection is occurring. When the touch-sensitive panel returns to the first position, the detector returns to the unselected state. Optionally, the touch-sensitive panel rests on a support which provides a bias force to urge the touch-sensitive panel to return to the first position from the second position. Further, an optional seal helps prevent ingress of moisture, etc. around the moveable touch-sensitive panel. In some embodiments, the touch-sensitive panel may be integrated with the display of the wireless communications device.

The touch-sensitive panel with selector of the present invention allows the user to select, and optionally, "drag-and-drop," without removing their finger from the touch-sensitive panel. In addition, the touch-sensitive panel with selector of the present invention optionally provides suitable tactile and audible feedback to the user. As such, the touch-sensitive panel with selector of the present invention should provide greater user satisfaction.

DETAILED DESCRIPTION

Figure 1:
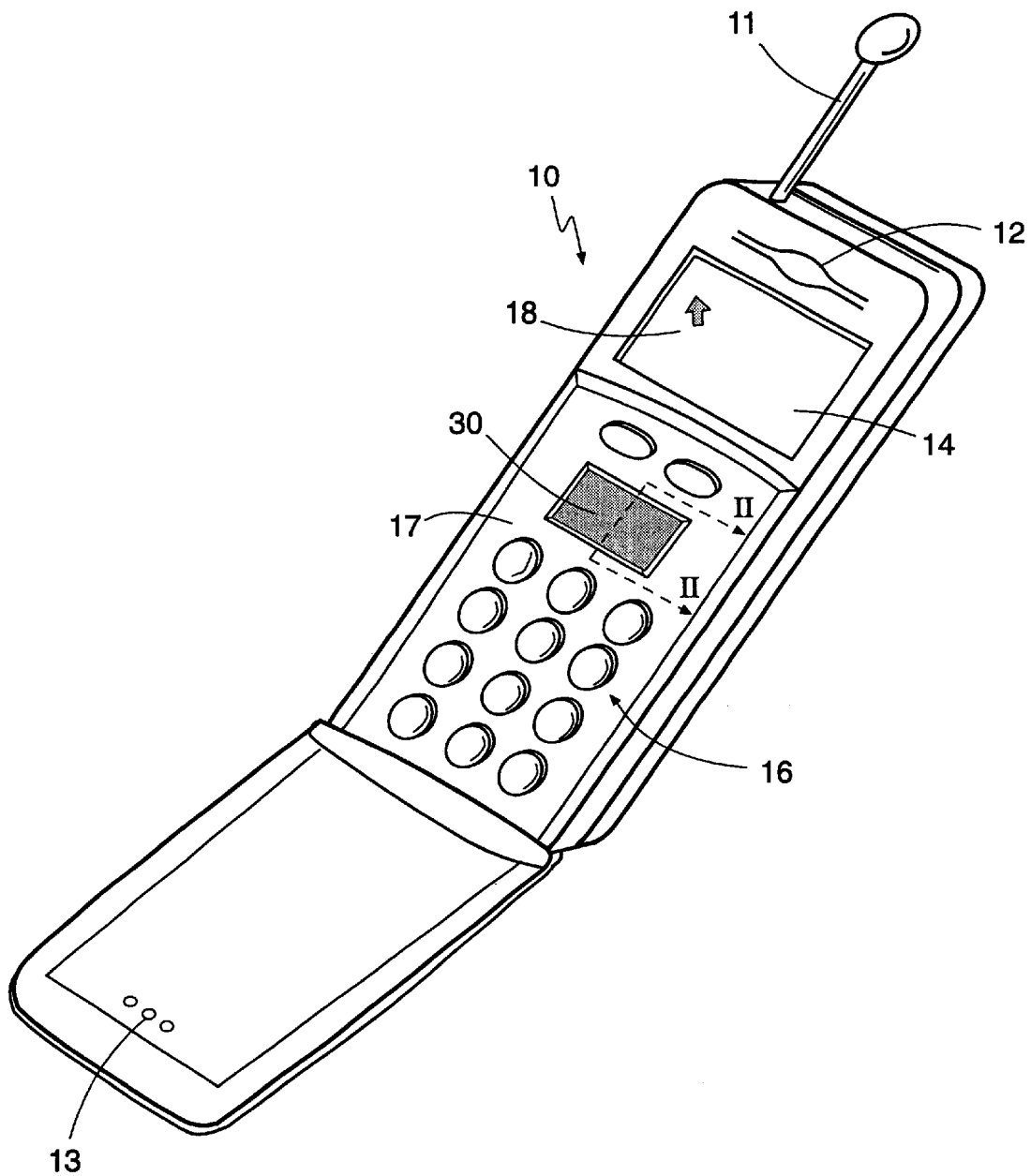
FIG. 1 is a perspective view of a cellular telephone incorporating the present invention.

FIG. 1 illustrates a hand-held cellular telephone 10 constructed in accordance with the present invention. The cellular telephone 10 is a fully functional radio transceiver capable of transmitting and receiving digital signals. The cellular telephone 10 typically includes an antenna 11, a speaker 12, a microphone 13, a display 14, and a keypad 16 which interact in a manner well known in the art. Speaker 12 converts received audio signals to an audible output that can be heard by the user. The microphone 13 converts the users speech or other audible input into audio signals. The display 14 allows the operator to see dialed digits, call status information, and prompts. It is preferred, but not required, that the display 14 have multi-line capability and more preferably have full graphical capability. On the display 14 is a moveable cursor 18. The keypad 16 allows the operator to dial numbers, enter commands, and the like.

In addition, the cellular telephone 10 of the present invention includes a touch-sensitive panel 30. The touch-sensitive panel 30 has a top surface 32, sides 36, and a bottom surface 34. In general, a touch-sensitive panel 30 is a device which detects the presence of a pointing device and monitors motion of that pointing device across its top surface 32. As is well known in the art, a pointing device may be wide variety of objects, including a person's finger or a pen. For clarity, a finger will be used as an illustrative example of a pointing device. When using a touch-sensitive panel 30, the finger is free to move in any direction across the top surface 32 and is not constrained to only orthogonal movement such as north-south and east-west. Using technology well known in the art, the touch-sensitive panel 30 monitors the movement of finger and communicates that movement to the telephone's electronics via an electrical connection such as a cable 38. Based on this information, the cursor 18 on the display 14 is made to move accordingly. That is, when the finger moves northeast on the touch-sensitive panel 30, the cursor 18 moves northeast on the display 14. This "cursor movement" function of a touch-sensitive panel 30 is well known in the art.

Figure 2:
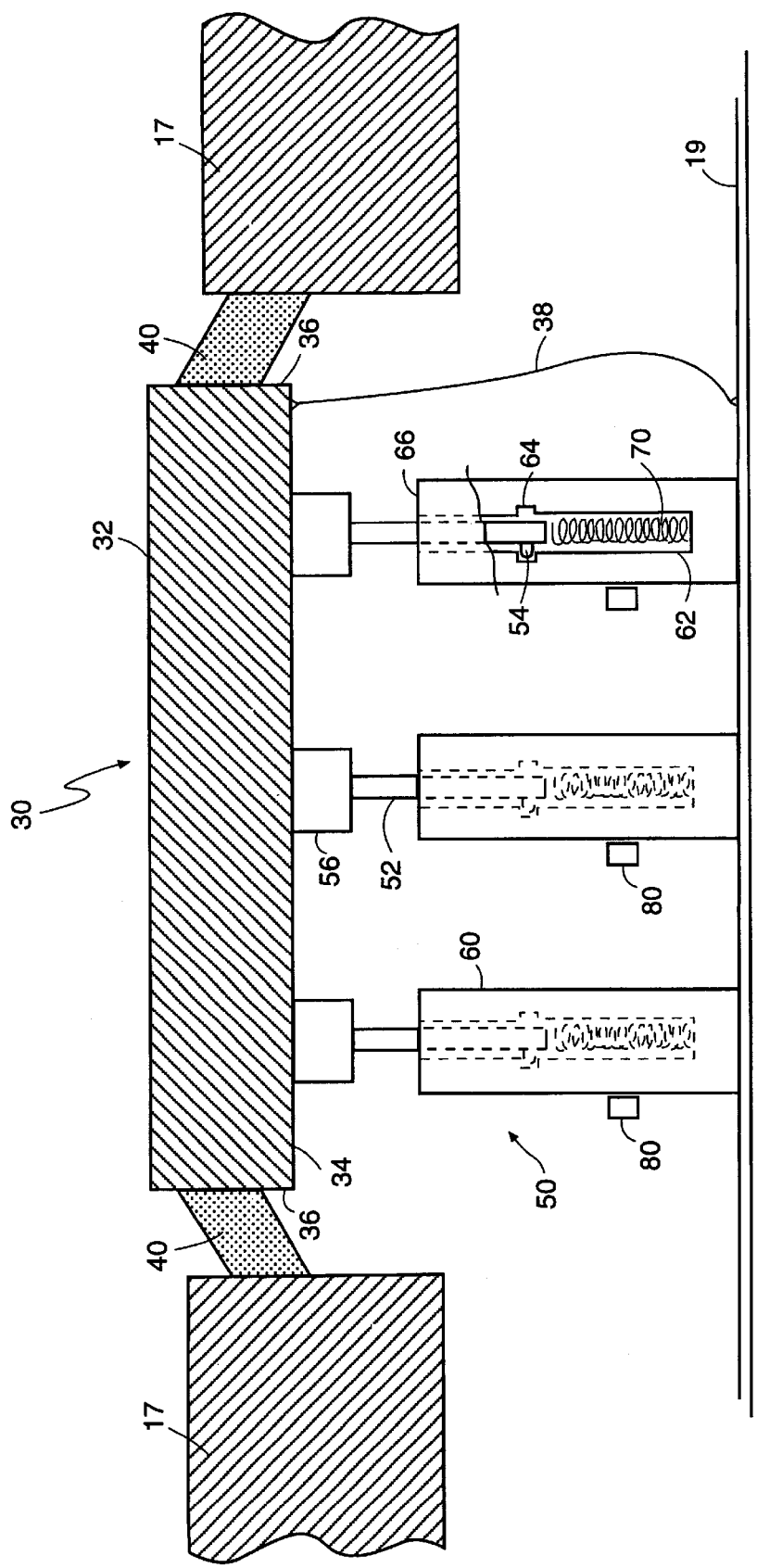
FIG. 2 is a partial sectional view along line II—II of FIG. 1 showing a touch-sensitive panel in the normal, or up, position.
Figure 3:
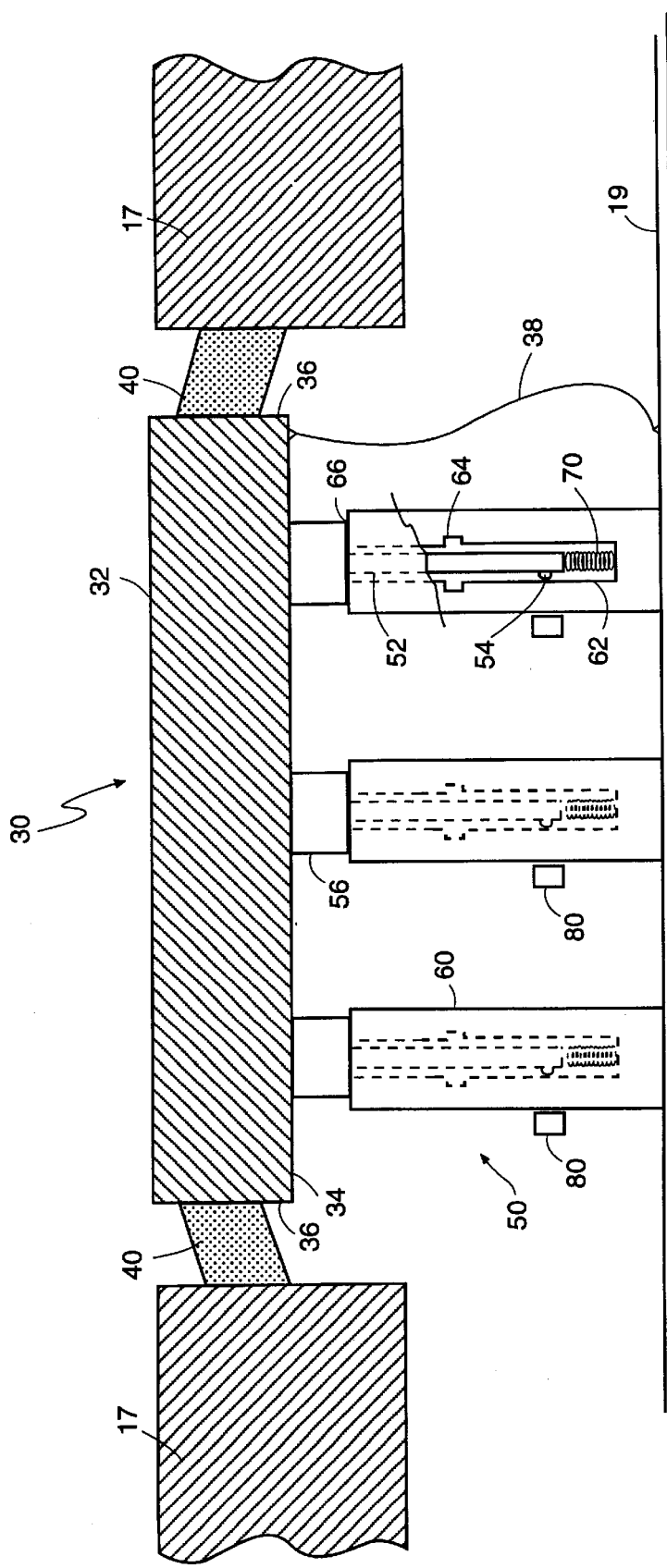
FIG. 3 is a partial sectional view along line II—II of FIG. 1 showing a touch-sensitive panel in the select, or down, position.

In contrast with existing cellular telephones 10 having touch-sensitive displays with fixed touch-sensitive panels 30, the touch-sensitive panel 30 of the present invention may be vertically displaced so as to function as a selector. Referring to FIG. 2, associated with the touch-sensitive panel 30 is a support 50 and an optional seal 40. The seal 40 surrounds the touch-sensitive panel 30 and provides a slidable interface between the touch-sensitive panel 30 and the keypad casing 17 on the front face of the telephone 10. Preferably, the seal 40 creates and maintains a water-, humidity-, and dust-tight seal 40 around the touch-sensitive panel 30 so as to prevent the ingress of moisture, dirt, and other debris into the interior of the phone 10. The seal 40 may be attached to the touch-sensitive panel 30, the keypad casing 17 of the phone 10, or both. The support 50 urges the touch-sensitive panel 30 into its normal operating, or up, position (FIG. 2) and detects when the touch-sensitive panel 30 is in the select, or down, position (FIG. 3).

A wide variety of assemblies may act as the support 50. One embodiment of the support 50 is shown in FIG. 2 and FIG. 3. The support 50 of FIG. 2 includes a plurality of shafts 52, a plurality of guides 60, a plurality springs 70, and a plurality of switches 80; preferably there are at least three of each. The shafts 52 extend downwardly from the bottom surface 34 of the touch-sensitive panel 30. The shafts 52 may be integral with the touch-sensitive panel 30 or may alternatively be affixed to the bottom surface 34 thereof. On a lower portion of at least one, and preferably each, shaft 52 is a small bump 54. Surrounding the upper portion of the shaft 52 is a collar 56 of larger diameter. Guides 60 extend up from a stationary portion of the cellular telephone 10, such as from the printed circuit board 19. Each guide 60 includes a vertical channel 62 of slightly larger diameter than the lower portion of the shaft 52 and a horizontal ring 64 of slightly larger diameter than the channel 62. The channels 62 may have round, square, hexagonal, or any other cross section, including variable cross sections corresponding to the cross sections of the shafts 52. In the bottom of the channel 62 is the spring 70.

The depth of the channel 62 and the location of the ring 64 are chosen so that the bump 54 on the shaft 52 rests in the ring 64 when the touch-sensitive panel 30 is in its normal operating, or up, position and the spring 70 is either not compressed or only slightly compressed. When the touch-sensitive panel 30 is in the select, or down, position, the bump 54 is displaced out of the ring 64, the spring 70 is compressed, and the collar 56 bottoms out against the top of the guide 66.

Associated with each guide 60, such as attached to the outside thereof, is a switch 80 for sensing when the touch-sensitive panel 30 is in the select position. For purposes of illustration, a magnet and reed switch 80 arrangement is shown in FIG. 2 and FIG. 3. In such an arrangement, a small magnet is molded into the shaft 52 to form the bump 54. The corresponding reed switch 80 detects the close proximity of the magnetic bump 54. The reed switch 80 is vertically located so as to be tripped when the touch-sensitive panel 30 is in the down, or select, position. The switch 80 communicates with the electronics. Preferably, the switches 80 are connected to the electronics in parallel so that the activation of any one of the switches 80 will close the circuit thereby indicating to the electronics that the touch-sensitive panel 30 is in the select, or down, position.

In operation, the touch-sensitive panel 30 operates normally in the up position. Due to the friction of the seal 40 and the presence of the bump 54 in the ring 64, a moderate level of pressure may be applied to the touch-sensitive panel 30, such as by a finger, without displacing the touch-sensitive panel 30. Thus, the touch-sensitive panel 30 remains a stable platform for light pressing such as that used to move the cursor 18. When a user desires to "select" something that is indicated at the cursor 18 position, the user applies a higher level of pressure to the touch-sensitive panel 30. This higher level of pressure should be some pre-determined level of force, such as two Newtons, five Newtons, ten Newtons, or some other level appropriate for user satisfaction. When this higher level of pressure overcomes the resisting force of the seal 40, the bump 54, and whatever light force applied by the spring 70, the touch-sensitive panel 30 is displaced downwardly. When the bump 54 is displaced from the ring 64, the amount of pressure to keep pushing the touch-sensitive panel 30 down is lower than that required to start the downward movement. This action provides some tactile feedback to the user. In addition, in the fully down position, the collars 56 bottom out against the guides 60, providing a positive stop feedback to the user. In the fully down position, the switches 80 are tripped, thereby notifying the electronics that a "selection" is occurring. With this embodiment, horizontal movement of the touch-sensitive panel 30, such as what might be expected when a finger is moved about on the top surface 32, will not trigger the selection.

In addition to the "select function," the present invention allows the touch-sensitive panel 30 to be used to "drag and drop" information from one cursor 18 position to another. To do so, the user keeps sufficient pressure on the touch-sensitive panel 30 to keep it in the down position while moving her finger to move the cursor 18 to the desired location and then releases the touch-sensitive panel 30 to return to the up position. With the present invention, only one finger is required to be used to perform cursor movement, selection, and dragging/dropping operations and that finger need not be removed from the touch-sensitive panel 30 to complete the task except to initiate the "drop."

Audible feedback may be achieved in a wide variety of ways. For instance, the speaker 12 may beep when the switch 80 circuit is closed. Similarly, a separate piezoelectric buzzer or the like may be used. Alternatively, any mechanical method well known in the key art, such as a cantilevered spring, may be used to generate a mechanical clicking sound when the touch-sensitive panel 30 is pushed into the down position.

An alternative embodiment of the present invention employs a touch-sensitive panel 30 that is hinged from one side, a spring 70 urging upwardly against the opposite side, and a switch 80 that is tripped when the touch-sensitive panel 30 swings down. There are numerous other equivalent embodiments; all that is required is that the touch-sensitive panel 30 be movable, preferably vertically, and a switch 80 or other detector positioned so as to detect when the touch-sensitive panel 30 is in the select position so as to activate a "select" function, and preferably enable a "drag and drop" function.

Figure 4:
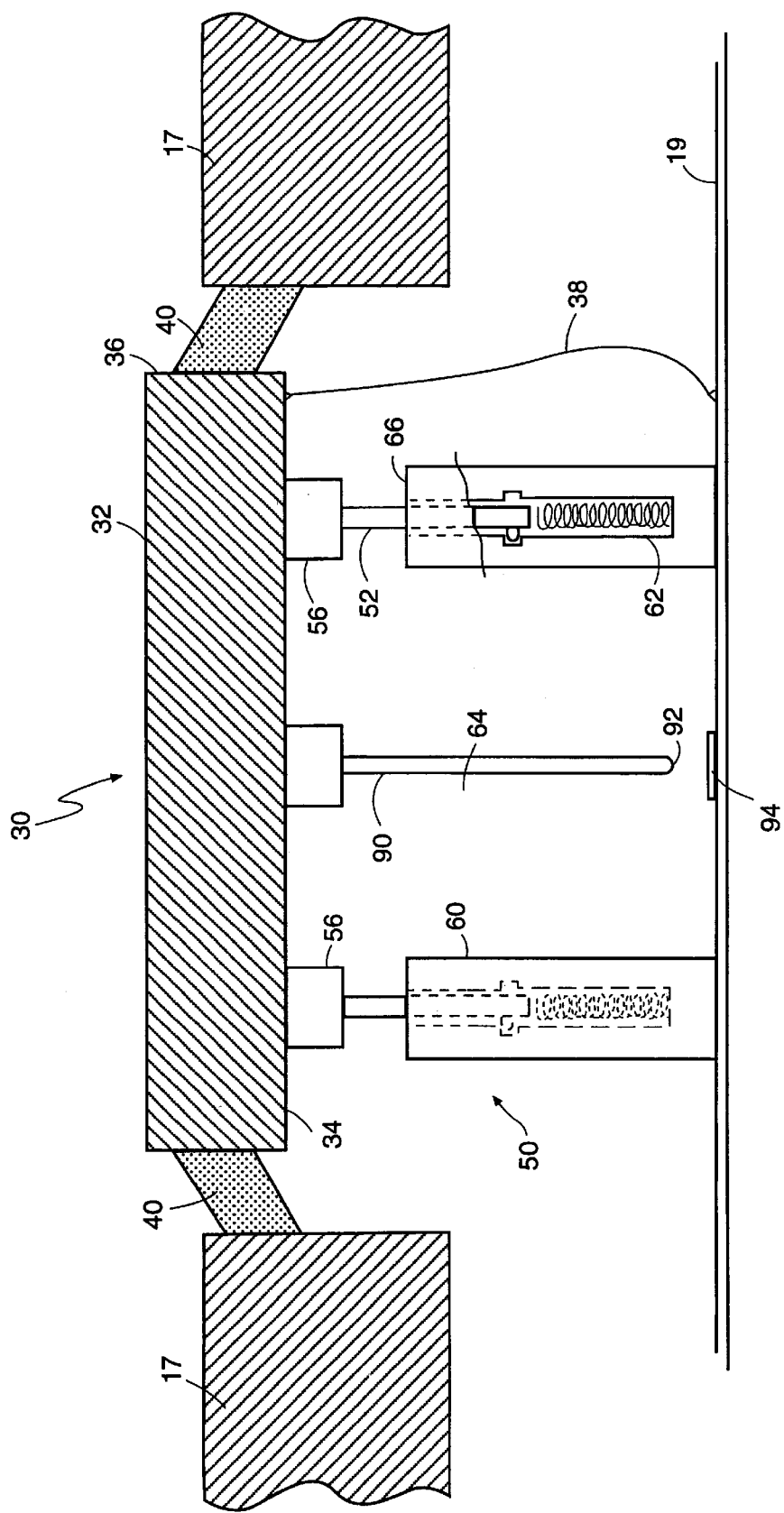
FIG. 4 is a partial sectional view along line II—II of FIG. 1 showing an alternative embodiment with the touch-sensitive panel in the normal, or up, position.

Another alternative embodiment of the support 50 is shown in FIG. 4. Like the support 50 shown in FIG. 2 and FIG. 3, this alternative support 50 includes a plurality of guides 60 and shafts 52. Preferably, there are three guides 60 arranged in a triangular fashion, but other numbers or arrangements may also suffice. In addition, there is a selector shaft 90 extending downwardly from the bottom surface 34 of the touch-sensitive panel 30. Preferably, the selector shaft 90 is centrally located on the touch-sensitive panel 30 and includes a rounded tip 92. The tip 92 is either composed of a conductive material or coated in a conductive material. Underneath the selector shaft 90 is a contact pad 94. The contact pad 94 may be of any type which closes a circuit upon being impinged by conductive surface of suitable size, such as an interleaved keypad contact well known in the art. When the touch-sensitive panel 30 is displaced downwardly, the tip 92 of the selector shaft 90 contacts the contact pad 94 and thereby completes an electrical circuit which notifies the electronics that a "selection" is occurring. In this manner, the combined tip 92 and contact pad 94 function as a switch 80. For such a physical contact approach, the selector shaft 90 should impact upon the contact pad 94 before the collars 56 of the shafts 52 impinge upon the top of the guides 66; the components should be sized accordingly. In addition, is may be desirable for the selector shaft 90 to be made slightly over-length but from a somewhat flexible material so as insure a good connection without damaging the contact pad 94.

Figure 5:
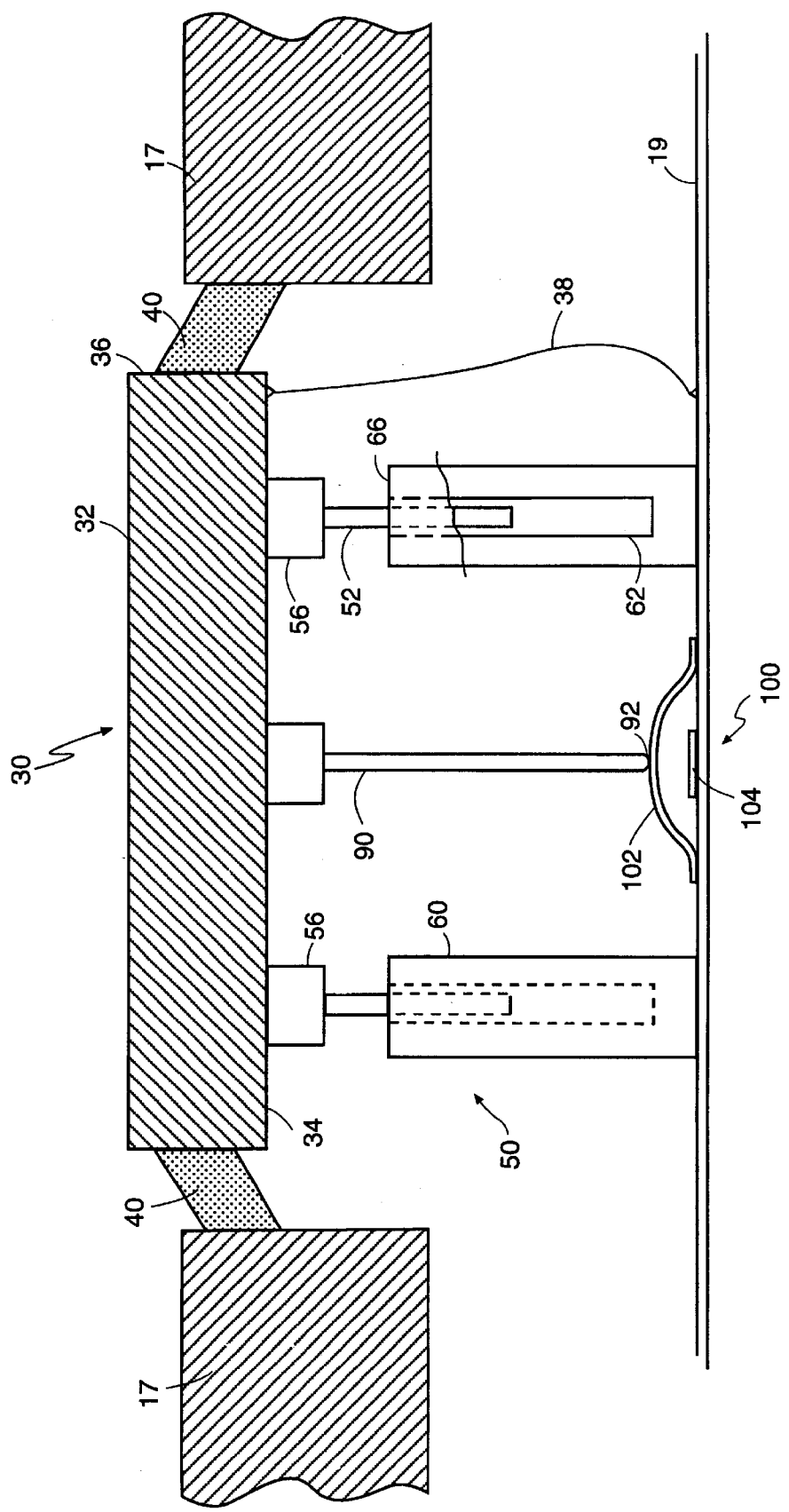
FIG. 5 is a partial sectional view along line II—II of FIG. 1 showing another alternative embodiment with the touch-sensitive panel in the normal, or up, position

In another embodiment shown in FIG. 5, the support 50 includes a plurality of guides 60 and shafts 52. However, the guides 60 of this embodiment include neither the horizontal rings 64 nor springs 70 of the embodiment shown in FIG. 4 and the shafts 52 do not include bumps 54. Preferably, there are three guides 60 arranged in a triangular fashion, but other numbers or arrangements may also suffice. In a like manner to the embodiment shown in FIG. 4, there is a selector shaft 90 extending downwardly from the bottom surface 34 of the touch-sensitive panel 30. In this embodiment, the tip 92 need not be conductive. Instead, directly underneath the selector shaft 90 is a domed switch 100. The domed switch 100 includes a deflectable dome 102 and a contact pad 104. The dome 102 is preferably make from thin spring steel or other material that can both spring back into the dome shape after being deformed and can withstand such deformation multiple times. When the touch-sensitive panel 30 is displaced downwardly, the tip 92 of the selector shaft 90 contacts the dome 102 and deflects it downwardly. Initially, the force required will be higher, but will thereafter be lower as the dome 102 begins to collapse. In the fully down position, the tip 92 of the selector shaft 90 will drive the dome 102 down into contact with the contact pad 104, thereby completing an electrical circuit which notifies the electronics that a "selection" is occurring. No springs 70 are required in the guides 60 of this embodiment because, when the user releases the touch-sensitive panel 30, the dome 102 will spring back into shape, thereby driving the touch-sensitive panel 30 back up into the normal position via its action against the selector shaft 90. In this embodiment, the selector shaft 90 should drive the dome 102 into contact with the contact pad 104 before the collars 56 of the shafts 52 impinge upon the top of the guides 66; the components should be sized accordingly.

While the preferred displacement of the touch-sensitive panel 30 is vertical, i.e. normal to its top surface 32, the present invention encompasses devices wherein such movement varies from perfectly normal by at least 30° or more. Further, the displacement need not be linear, such as the arcuate displacement of the hinged embodiment discussed above. Such minor variations do not change the fundamental inventive approach of a movable touch-sensitive panel 30 having an associated switch 80, 100 or detector for detecting when the touch-sensitive panel 30 is in a certain position.

Further, the movable touch-sensitive panel 30 of the present invention may also function as the display 14. That is, the touch-sensitive panel 30 may have a variable visible background (when viewed from above) so as to be able to display information. For instance, the keypad 16 may be replaced by a portion of the touch-sensitive panel 30 having a graphical representation of a keypad 16 and the remainder of the touch-sensitive panel 30 may function as a graphical display 14. When a user pushes a "number" on the "keypad" 16, the touch-sensitive panel 30 is displaced and the electronics are notified of the finger's position on the touch-sensitive panel 30 and the displacement of the touch-sensitive panel 30 into a selection position. From this information, the electronics may determine what number has been entered. Further, in such an embodiment, the user may touch the display portion of the touch-sensitive panel 30 so as to utilize the "cursor movement", "select," or "drag and drop" functions. In such an embodiment, the touch-sensitive panel 30 is functioning as both an input means and an output means.

Figure 6:
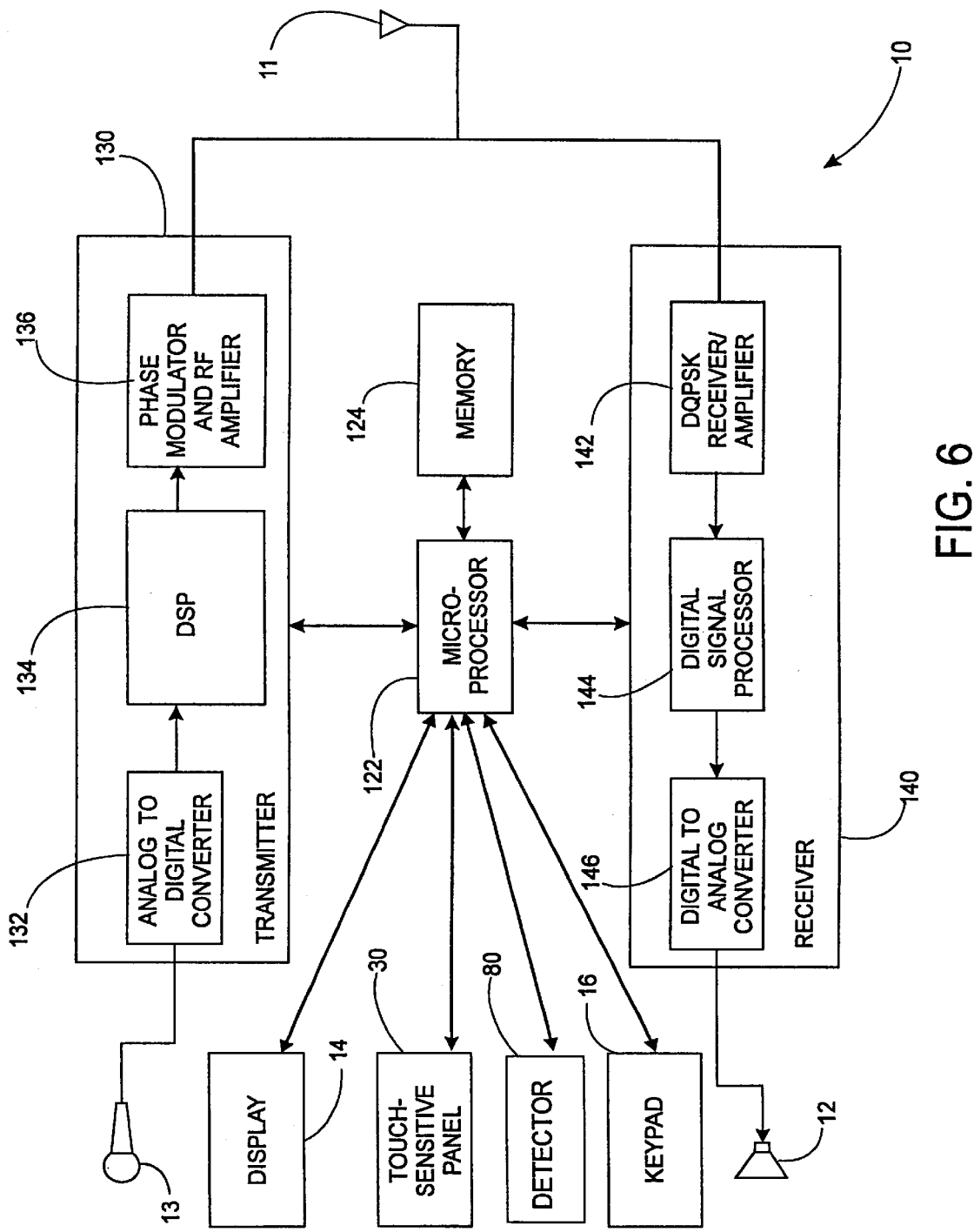
FIG. 6 is a simplified block diagram of one embodiment of a wireless communications device of the present invention.

FIG. 6 is one possible block diagram of the cellular telephone 10. The cellular telephone 10 includes a microprocessor 122, program memory 124, a transmitter 130, and a receiver 140. The analog audio signals from the microphone 13 are applied to the transmitter 130. The transmitter 130 includes an analog to digital converter 132, a digital signal processor 134, and a phase modulator/RF amplifier 136. The analog to digital converter 132 converts the analog audio signals from the microphone 13 into a digital audio signal. The digital audio signal is passed to the digital signal processor (DSP) 134 which compresses the digital audio signal and inserts error detection, error correction and signaling information. The compressed and encoded signal from the digital signal processor 134 is passed to the phase modulator/RF amplifier 136. The modulator/RF amplifier 136 converts the signal to a form that is suitable for transmission on a RF carrier via the antenna 11.

The receiver 140 includes a detector/amplifier 142, digital signal processor 144, and a digital to analog converter 146. Digital signals received by the antenna 11 are passed to the receiver/amplifier 142 which boosts the low-level RF digital signal to a level appropriate for input to the digital signal processor 144. The digital signal processor 144 includes an equalizer to compensate for phase and amplitude distortions in the channel corrupted signal, and a demodulator for extracting the transmitted bit sequence from the received signal. A channel decoder detects and corrects channel errors in the received signal. The channel decoder also separates control and signaling data from speech data. The control and signaling data is passed to the microprocessor 122. Speech data is passed to the digital to analog converter 146. The output of the DSP 144 is passed to the digital to analog converter 146. Digital to analog converter 146 converts the digital audio signal into an analog output signal and passes the signal to the speaker 12 to generate an audible output that can be heard by the user.

The microprocessor 122 coordinates the operation of the transmitter 130 and the receiver 140 according to program instructions stored in memory 124. These functions include power control, channel selection, timing, as well as a host of other functions. The microprocessor 122 inserts signaling messages into the transmitted signals and extracts signaling messages from the received signals. The microprocessor 122 responds to any base station commands contained in the signaling messages, and implements those commands. When the user enters commands via the keypad 16, the commands are transferred to the microprocessor 122 for action.

The discussion above has used a digital cellular telephone 10 for illustrative purposes; however, the present invention is not limited to digital cellular telephones 10. Instead, the present invention encompasses any wireless communications device which includes a movable touch-sensitive panel 30 and an associated switch 80, 100 or detector for detecting when the touch-sensitive panel 30 is in a certain position so as to act as a selector. Examples of other wireless communications devices include analog cellular telephone, personal communications assistants, pagers, satellite phones, portable computers with wireless communications capability, and the like.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communication device including a display having a cursor thereon, comprising:
   a touch-sensitive panel controlling the cursor and movable between a first position and a second position;
   a plurality of distinct detectors associated with said touch-sensitive panel and operable between a selected state and an unselected state;
   a plurality of bias elements associated with said plurality of detectors, wherein said bias elements urge said touch-sensitive panel towards said first position when said touch-sensitive panel is in said second position; and
   wherein at least one of said plurality of detectors assumes selected state when said touch-sensitive panel is in said second position and assumes said unselected state when said touch sensitive panel is in said first position.

2. The device of claim 1 wherein said touch-sensitive panel is normally disposed in said first position and movable to said second position in response to the user applying a force thereto at or above a pre-determined force level.

3. The device of claim 2 wherein said pre-determined force level is 2 Newton or more.

4. The device of claim 1 wherein said touch-sensitive panel generates control signals in response to the location of a pointing device thereon.

5. The device of claim 4 wherein said pointing device is a finger of the user.

6. The device of claim 1 wherein said first position is vertically higher than said second position.

7. The device of claim 1 further including a hinge connected to said touch-sensitive panel and wherein said touch-sensitive panel rotates about said hinge between said first position and said second position.

8. The device of claim 1 wherein said touch-sensitive panel has sides and further comprising a seal disposed around said sides of said touch-sensitive panel.

9. The device of claim 1 wherein said detectors are spring loaded switches.

10. The device of claim 9 wherein said spring loaded switches are domed switches.

11. The device of claim 1 wherein said display includes said touch-sensitive panel.

12. The device of claim 1 wherein said wireless communications device is a cellular telephone.

13. A wireless communications device including a display having a cursor thereon, comprising:
   a) a main casing;
   b) a touch-sensitive panel for controlling the cursor and having sides; said touch-sensitive panel movable between a first position and a second position; wherein said first position is vertically higher than said second position;
   c) a seal disposed between said sides of said touch-sensitive panel and said casing;
   d) switch associated with said touch-sensitive panel and operable between a selected state and an unselected state;
   e) a bias element associated with said switch wherein said bias element urges said touch-sensitive panel towards said first position when said touch-sensitive panel is in said second position;
   f) said touch-sensitive panel having associated therewith a plurality of downwardly extending shafts;
   g) a plurality of guides disposed beneath said touch-sensitive panel, said guides limiting sideways movement of said touch-sensitive panel by slidably accepting said shafts; and
   h) wherein said switch assumes said selected state when said touch-sensitive panel is in said second position and assumes said unselected state when said touch-sensitive panel is in said first position.

14. The device of claim 13 further including means for providing a user with tactile feedback when the user moves said touch-sensitive panel from said first position to said second position.

15. The device of claim 13 wherein said switch is a domed switch.

16. The device of claim 13 wherein said display includes said touch-sensitive panel.

17. A wireless communications device including a display having a cursor thereon, comprising:
   a) a touch-sensitive panel normally disposed in a first position and movable to a second position by the user applying a force thereto; said touch-sensitive panel generating control signals in response to the location of a pointing device thereon for controlling said cursor;
   b) means for movably supporting said touch-sensitive panel and urging said touch-sensitive panel towards said first position; and
   c) means for detecting when said touch-sensitive panel is in said second position.

* * * * *